United States Patent [19]

Wells, Jr.

[11] 4,152,797
[45] May 8, 1979

[54] PRECISION SMALL WIRE AND UNTWISTING TOOL

[75] Inventor: Peter M. Wells, Jr., Sycamore, Ill.

[73] Assignee: Ideal Industries Incorporated, Sycamore, Ill.

[21] Appl. No.: 669,294

[22] Filed: Mar. 22, 1976

Related U.S. Application Data

[62] Division of Ser. No. 610,537, Sep. 5, 1975, Pat. No. 4,047,297.

[51] Int. Cl.² .......................... H02G 1/00; B25B 7/22
[52] U.S. Cl. ........................................ 7/129; 81/5.1 R
[58] Field of Search .................. 7/5.4, 4, 3 R; 81/3 R, 81/5.1, 418, 423, 421, 425 R, 422, 9.5 R; 140/118, 123; 30/271

[56] References Cited

U.S. PATENT DOCUMENTS

| 359,890 | 3/1887 | Rue | 30/271 |
|---|---|---|---|
| 841,458 | 1/1907 | Scott | 30/271 |
| 1,385,516 | 7/1921 | Bernard | 140/118 |
| 1,897,700 | 2/1933 | Jones | 140/118 |
| 2,031,167 | 2/1936 | Krosman | 140/118 |
| 3,675,359 | 7/1972 | Ohno | 30/271 |
| 3,710,406 | 1/1973 | Stanford | 7/5.1 |
| 3,875,601 | 4/1975 | Kaufman | 81/9.5 R |

Primary Examiner—James L. Jones, Jr.
Assistant Examiner—Roscoe V. Parker
Attorney, Agent, or Firm—Kinzer, Plyer, Dorn & McEachran

[57] ABSTRACT

A multi-purpose hand tool for use with fine gauge insulated wire. The hand tool can be used to cut wire, to cut and strip insulation from wire and to untwist twisted pairs of wire. The insulation cutting and stripping portion of the tool has an alignment guide for the wire which floats relative to the cutting blade for accuracy of alignment of the wire with the insulation stripping aperture. The wire untwisting means includes plastic pads carried by the tool members and movable into closely spaced relationship with each other upon closing of the tool to engage and straighten the wires of a twisted pair of wires pulled between the pads.

2 Claims, 6 Drawing Figures

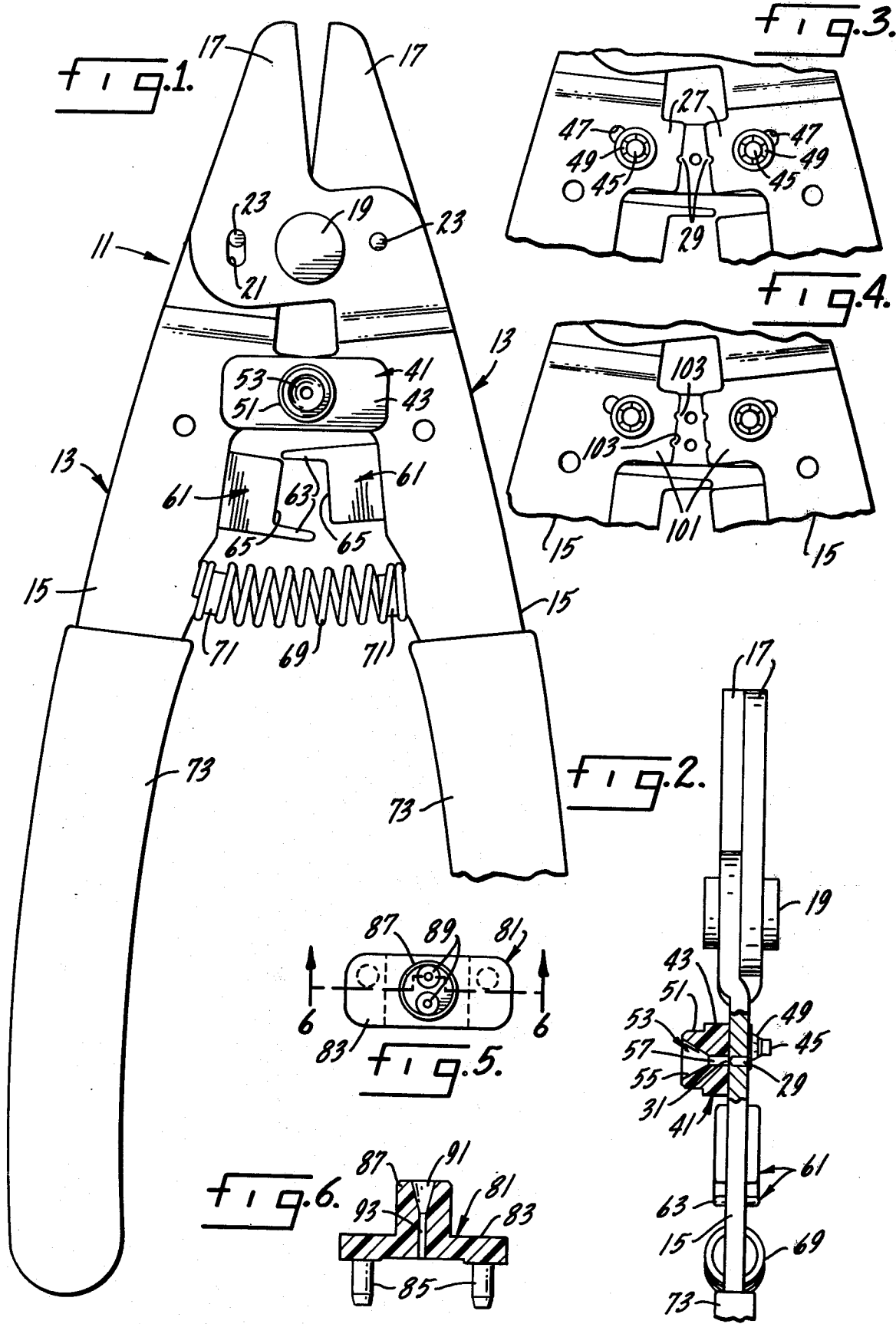

PRECISION SMALL WIRE AND UNTWISTING TOOL

This application is a division of Ser. No. 610,537, filed Sept. 5, 1975 now U.S. Pat. No. 4,047,297, isued Sept. 15, 1977.

SUMMARY OF THE INVENTION

This invention is concerned with a precision hand tool useful for cutting and stripping the insulation of an insulated wire, for untwisting a pair of twisted wires and for cutting insulated wires. It is particularly concerned with such a multi-purpose tool for use with fine gauge insulated wire.

An object of this invention is a hand tool having means for cutting and stripping the insulation of an insulated wire of fine gauge without nicking the wire.

Another object of this invention is a hand tool having insulation stripping means for fine gauge wire in which the wire is aligned with the insulation cutting blade by a floating wire guide.

Another object is a tool having means for untwisting a twisted pair of fine gauge wires.

Another object is a hand tool having wire untwisting means consisting of a pair of plastic pads that engage and straighten the wires of a twisted pair of wires pulled between the pads.

Another object is a precision hand tool capable of simultaneously stripping a pair of fine gauge insulated wires.

Other objects may be found in the following specification, claims and drawings.

BRIEF DESCRIPTION OF THE DRAWINGS

The invention is illustrated more or less diagrammatically in the following drawings wherein:

FIG. 1 is a front elevational view on an enlarged scale of a tool embodying the novel features of this invention;

FIG. 2 is a side view of the tool of FIG. 1 with portions shown in cross-section; FIG. 3 is a partial view of the reverse side of the tool that shown in FIG. 1;

FIG. 4 is a partial rear elevational view of a modified form of tool;

FIG. 5 is a plan view of a modified form of wire guide; and

FIG. 6 is a cross-sectional view taken along lines 6—6 of FIG. 5.

DESCRIPTION OF THE PREFERRED EMBODIMENTS

FIG. 1 of the drawings shows a hand held tool 11 which may be used for cutting and stripping insulation from wire of fine gauge. The tool is especially useful in stripping insulation of synthetic plastic which is extremely tough and difficult to cut. The tool includes two elongated members 13 of almost identical construction. Conveniently, these members may be metal stampings. Each elongated member includes a handle portion 15 and a wire cutting blade portion 17. The blade portion of each member is offset both from the axis of the handle portion and laterally from the plane of the handle portion. The offset of the blade portion from the plane of the handle portion is equal to one half the thickness of the handle portion so that the blade portions are flush with each other when the handle portions are aligned as shown in FIG. 2. The elongated members 13 are pivotally connected by a rivet 19 extending through openings (not shown) formed in the offset portions of the members. Each wire cutting blade portion includes an arcuate slot 21 and a projecting pin 23 each located on opposite sides of the rivet opening. The pin 23 may be force fitted into a suitable hole (not shown) formed in the member. The projecting pin of one member fits into the slot of the other member with the pin and slot forming stop means to limit opening pivotal movement of the elongated members 13 relative to each other.

A projection 27 is formed on an edge of each handle portion. These projections are similarly located on each handle portion so that they move into contact with one another when the handles are pivotally moved together. A semi-cylindrical groove 29 is formed at the contacting edges of each projection. The groove 29 extends partially through the thickness of the handle portion 15. The groove terminates in a semi-cylindrical cutting edge 31. The groove and cutting edge may be formed by drilling through the handle portion so that only the tip of the drill extends out of the handle portion. In order for the cutting edges 31 on the pair of handle portions to be located on the same side of the tool, it is necessary for the grooves to be drilled from opposite sides of each of the handle portions.

When the projections 27 come together upon actuation of the tool, the semi-cylindrical grooves 29 and cutting edges 31 form an insulation supporting tube and insulating cutting element having an aperture. The cutting aperture has a diameter no less than the diameter of the core portion of the wire to be stripped and the insulation supporting tube has a diameter no less than the outside diameter of the insulation jacket of the wire.

A wire alignment guide 41 formed of a suitable plastic such as nylon is mounted on the insulation cutter edge side of the tool. The wire alignment guide includes an elongated rectangular base 43 which extends between the handle portions 15. Stubs 45 formed on the base extend through arcuate slots 47 formed in the handle portions 15. Spring like locking grippers 49 fit over the stubs and hold the wire alignment guide in position on the tool. The opposite side of the base 43 from the stubs has an upstanding cylindrical projection 51 formed thereon. An opening 53 extends axially through this projection and the base. The opening has a funnel shaped entrance 55 which merges with a cylindrical passage 57. The cylindrical passage has a diameter substantially equal to the outside diameter of the insulation of the wire to be stripped.

The arcuate slots 47 in which the wire alignment guide rides are located on the same circle as the semi-cylindrical grooves 29 and cutting edges 31. The slots are formed so that the ends of the slots will contact the stubs 45 of the wire alignment guide to center the cylindrical passage 57 of the guide with the cutting aperture as the projections 27 contact each other.

A pair of wire untwisting pads 61 are mounted on projections formed on the handle portions 15 adjacent to the projections 27. The pads 61 are formed of a suitable relatively soft plastic such as nylon and are of identical construction. Each has an outwardly extending portion 63 at one end thereof which overlaps the other pad 61 when the handle portions are moved together upon closing movement of the tool. The faces 65 of the pads are moved close to but not in contact with each other upon closing of the tool. The pads may be closed on a pair of twisted wires to thereby form a restricted passage for the wires.

A compression spring 69 fits over projections 71 formed on the handle portions 15 to bias the handle portions away from each other. Insulating sheaths 73 fit over the handle portions outwardly of the compression spring 69. The insulating material may be vinyl or other suitable material.

A modified form of wire alignment guide and insulation cutting and stripping projections is shown in FIGS. 5 and 6 of the drawings. The modified guide and cutting projections are provided to simultaneously strip two wires. The modified alignment guide 81 is formed of a suitable plastic and includes a base 83, stubs 85 to opposite ends of the base which extend through the arcuate slots 47 formed in the handle portions 15 of the tool 11. Locking members 49 fit over the stubs to hold the wire alignment guide 81 in position of the cutting tool. The wire alignment guide has a generally cylindrical upstanding projection 87 formed on the base 83 on the side opposite to the stubs 85. A pair of openings 89 extend axially through the projection and the base 83. Each opening has a funnel shaped entrance 91 which connects with a cylindrical passage 93. The diameter of the cylindrical passage 93 is approximately equal to the outside diameter of the insulation of the wire to be stripped.

The projections 101 formed on the handle portions 15 each have a pair of spaced semi-cylindrical grooves 103 with each groove having a semi-cylindrical cutting edge at one end thereof. When the projections 101 are brought together, the grooves 103 formed insulation supporting tubes and insulation cutting apertures. Whereas in this example, the semi-cylindrical grooves and cutting edges are of the same diameter, as would be necessary for cutting both strands of the twisted pair of wires, it should be understood that these grooves and cutting edges could be of different diameters for use with wires of different diameters.

The use, operation and function of this invention are as follows:

The multi-purpose hand tool 11 of this invention is intended for use with fine gauge insulated wire of the type commonly used in electronic devices. Wire of this type ranges in size from 18 to 32 A.W.G. and smaller. The wire core in usually covered with a synthetic plastic insulation. This insulation is very thin and very tough and is exceedingly difficult to remove without nicking the wire core. These wires frequently are found in twisted pairs, especially in electronic communication devices.

The blades 17 of this multi-purpose tool are used to cut wire. These blades, which are shown as having a 90° cutting angle as would be obtained from a stamping, may also be provided with a tapered cutting edge. In addition to use in cutting, the tool of this invention may also be used for stripping insulation from the ends of wires. The end of the wire to be stripped is inserted into the funnel shaped entrance 55 of the wire alignment guide 41. The wire is pushed through the guide so that it extends between the insulation cutting blades or projections 27 formed on the handle portions 15 of the elongated members 13. The moving together of the handle portions 15 of the tool will force the wire alignment guide 41 into alignment with the semi-cylindrical cutting edges 31 of the insulation cutting blades. The semi-cylindrical grooves 29 formed in the projections 27 are also centered upon and engage the insulation covering the wire thereby providing support for the insulated wire while the insulation is being cut by the cutting edges 31. The cutting edges 31 cut through the insulation but stop short of the core of the wire. With the handle portions 15 held together, the insulation is stripped from the wire by moving the tool relative to the wire.

The modified form of tool shown in FIGS. 4, 5 and 6 of the drawings may be used to simultaneously strip insulation from both wires of a pair of wires. Additionally, the wire stripping cutting elements 103 may be of different sizes so that wires of different diameters may be stripped either simultaneously and individually.

The tool of this invention may also be used for untwisting pairs of twisted wires. The wires are untwisted by inserting them between the wires untwisting pads 61 which are formed of a soft plastic such as nylon. When the wires are positioned between the pads, the handle portions 15 are moved together moving the pads towards each other and trapping the pair of twisted wire between the faces 65 of the pads and the overlapping portions 63 of the pads. With the faces 65 of the pads held in close proximity of one another, the twisted wire is pulled between the pads. The pads engage the wires and tend to parallel the wires and untwist them.

The compression spring 69 urges the handle portions 15 apart which carries the blades 17 to their open position. The amount of opening of the blades is controlled by the stop members 23 which ride in the slots 21 formed in the blade portions.

We claim:

1. A tool for use with fine gauge insulated wire formed in twisted pairs, said tool including a pair of elongated members pivotally connected to each other, handles on one side of the pivot to provide manual manipulation for the tool, cutting blades on the elongated members, and a wire untwisting device on the members including a plastic pad mounted on each elongated member on the inner surface thereof in facing relation to each other so upon pivotal movement of the elongated member the pads move toward and away from each other, an opposed surfaces on each of the pads which close upon manipulation of the elongated members to form a guideway which engages the wires and causes them to untwist when the wire is being pulled therethrough and the handles are held with the opposed surfaces closely adjacent to each other defining the guideway, and a first projecting means on one of the pads which, when the elongated members are in their open position, is spaced from the other pad to provide an opening so that the twisted wires may be inserted, and a second projecting means on one of the pads spaced from said first projecting means longitudinally therefrom and being substantially in the same plane of the pads, said first and second projecting means each extending from their respective pad to overlap the other pad so as to close the guideway at each end when the handles are manipulated to the closed position.

2. The structure of claim 1 further characterized in that the cutting blades are on one side of the pivot and the plastic pad is on the other side.

* * * * *